Aug. 23, 1955 R. S. PITT 2,716,160

BRAKE FOR TELEPHONE CALLING DIALS

Filed Dec. 30, 1953

INVENTOR
R. S. PITT

BY

ATTORNEY

United States Patent Office 2,716,160

Patented Aug. 23, 1955

2,716,160

BRAKE FOR TELEPHONE CALLING DIALS

Robert S. Pitt, Madison, N. J., assignor to Bell Telephone Laboratories, Incorporated, New York, N. Y., a corporation of New York Application December 30, 1953, Serial No. 401,341

6 Claims. (Cl. 179—90)

This invention relates to telephone call transmitters of the finger wheel operated type and more particularly to a braking means for preventing the manual acceleration of the finger wheel during its pulsing cycle.

Calling dials of the type to which this invention is applicable are of the electrical impulse type, that is, they open and close the circuit to the central office a given number of times in accordance with the code dialed by the operator of the call transmitter, such opening and closing of the circuit to the central office being known as pulsing and the result of the code dialed by the person operating the dial being known as a train of pulses.

The train of pulses transmitted by the calling dial operates apparatus at the central office which in turn sets up circuits in accordance with the code transmitted.

In the call transmitter to which this invention is applicable, suitable indicia are imprinted on a number plate which underlies a finger wheel having finger holes or apertures therein juxtapositioned with respect to the indicia to permit the operator to dial a particular code by rotating the finger wheel in the well-known manner. A driving spring associated with the finger wheel restores the wheel to normal and at the same time transmits a series of pulses over the circuit to the central office.

For the satisfactory operation of the central office equipment it is highly desirous that the pulse trains submitted have certain definite characteristics and a certain minimum length of time between successive pulse trains.

In order to control the speed of the finger wheel on its return to normal, governors are provided. However, these governors do not entirely prevent an impatient operator from changing the pulsing rate of the dial by manually accelerating the return of the finger wheel in order, as he might assume, to speed up the completion of the call, when as a matter of fact, it may result in wrong codes being sent out by transmitting wrong pulses.

The invention described herein eliminates or reduces to a minimum, the tendency of the finger wheel to be manually accelerated on its return to normal.

One of the objects of the present invention is the provision of a brake mechanism which will permit normal dialing unimpeded but will impede the rotation of the finger wheel in those instances where the operator of the dial attempts to manually accelerate the return of the finger wheel to its normal position to speed up the dialing operation.

Another object of the present invention is to provide a brake for call transmitters which reduces to a minimum the forcing torque at the finger wheel prior to the point where it applies to the dial mechanism.

A further object of the invention is to provide a brake for call transmitters which prevents the manual acceleration of the finger wheel on its return to normal but permits it to return to normal or to its run-down position under the proper pulsing speed.

The call transmitter brake of this invention provides means for preventing manual acceleration of the finger wheel during its run-down and comprises a flexible metal band the ends of which cross one over the other and are secured to studs on the underside of the finger wheel with the loop portion of the band positioned around a stationary drum which is rigidly secured to the dial structure and underlies the finger wheel.

Upon forward movement of the finger wheel and its return to its run-down or normal position under the influence of the driving spring, the band is out of contact with the drum. However, if the finger wheel is manually accelerated during its run-down, the band will frictionally engage the drum and prevent the finger wheel from returning to its run-down position faster than it would under the influence of the driving spring.

The invention will be more clearly understood from the following detailed description when read in connection with the following drawing in which.

Figure 1:
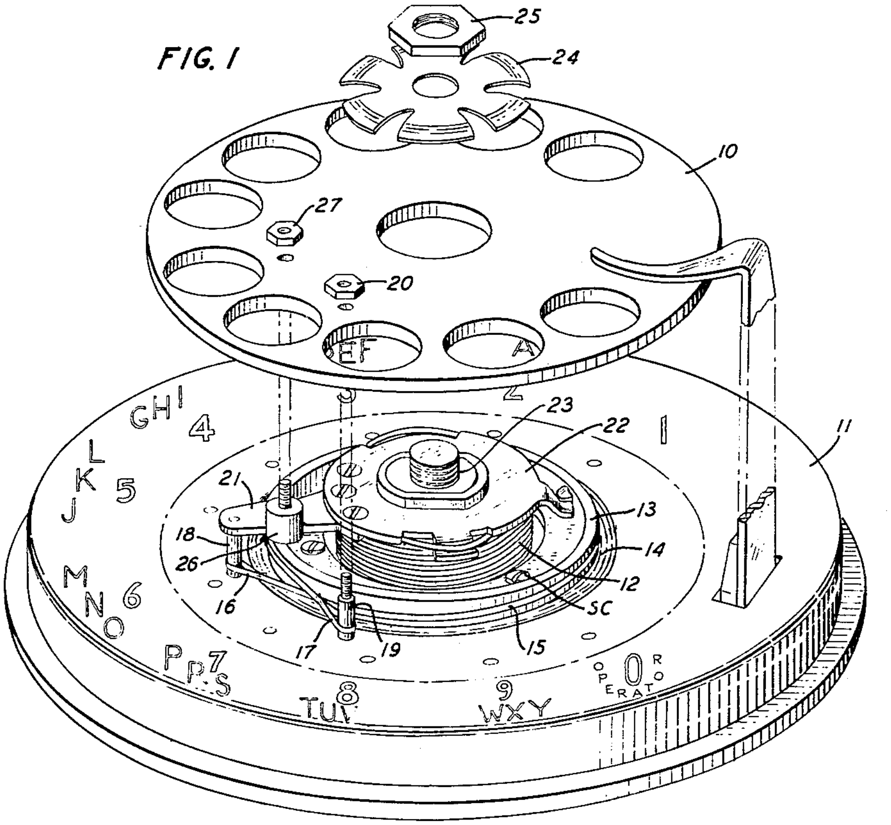
Fig. 1 is a fragmentary exploded perspective view of a call transmitter with the brake band of this invention in position thereon.

As shown in Fig. 1 of the drawing, the call transmitter to which the brake of this invention is particularly adapted, is of the same general construction as the call transmitter shown in Patent 2,563,581 of Clarke et al., dated May 7, 1951, which comprises the usual finger wheel 10, the number plate 11 and the drive spring 12. Since the structure of the call transmitter driving mechanism forms no part of this invention no further description of it is believed necessary.

Figure 2:
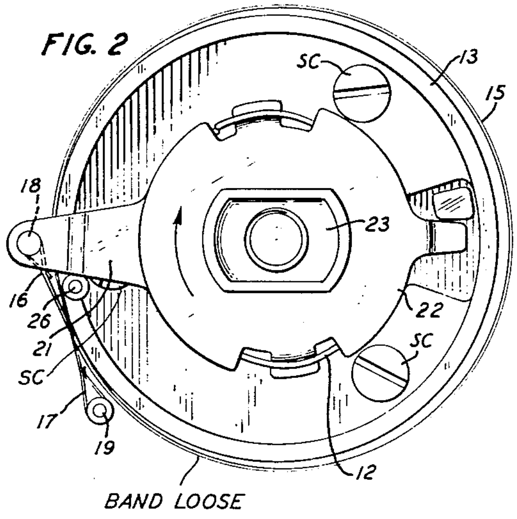
Fig. 2 is a fragmentary plan view with the brake band arm, which is secured to the driving hub, in its normal position.
Figure 3:
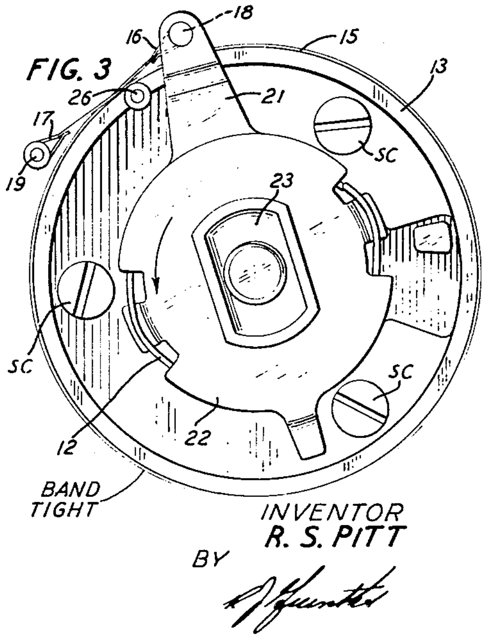
Fig. 3 is a view similar to Fig. 2 but with the brake band arm being forced counterclockwise as the finger wheel returns to its run-down position under manual acceleration.

In accordance with this invention, a brake drum 13, is rigidly secured to the frame (not shown) of the call transmitter, projects upwardly through a central aperture 14 in the dial number plate 11 and is fastened in position on the frame by means of the screws SC as shown in Figs. 2 and 3. Positioned around the drum 13, with their ends crossing one over the other, is the flexible brake band 15, the ends of which are provided with looped portions 16 and 17. As shown, the loop 16 is positioned on the pin 18 and the loop 17 is positioned on the pin 19. The pin 19 projects downwardly from the underside of the finger wheel 10 and is secured thereto by means of the nut 20.

A projecting arm 21 is secured to the finger wheel hub 22 which is keyed to the main shaft 23 and is adapted to be driven in a counterclockwise direction by the drive spring 12. The arm 21 carries at its extremity a downwardly extending pin 18 to which is secured loop 16 on the other end of the band 15. The finger wheel 10, which is secured to the drive shaft by means of the washer 24 and the nut 25, is free to turn on the hub 22 a limited amount. This limited amount of movement is controlled by the downwardly projecting pin 26 which is secured to the underside of the finger wheel 10 by means of the nut 27 and which bears against the arm 21 to provide a positive drive on the windup of the spring 12 and a normal run-down as the finger wheel 10 returns to its normal position under the influence of the spring 12. If an impatient operator attempts to speed up the return of the dial to its normal position by manual acceleration, the forcing torque causes the pin 26 to move away from the arm 21 as shown in Fig. 3 thus tightening the band 15 around the brake drum 13 and preventing the finger wheel 10 from returning to normal at a speed greater than the adjusted maximum speed.

Thus we have the ratio of the tension on the brake band at the finger wheel pin 26 ($T_1$) to the tension in the band at the hub pin 18 ($T_2$) as stated by the well-known belt theory as, $$\frac{T_1}{T_2}=e^{\mu\alpha}$$

where:

$\alpha$=angle of contact between band and drum in radians
$\mu$=coefficient of friction
$e$=base of natural logarithms In a typical brake of this invention, $\alpha$=6.40 radians. If we take $\mu$=.25, the ratio $$\frac{T_1}{T_2}=e^{.25\times 6.4}=4.95$$

Thus it is seen that the forcing torque applied to the call transmitter as disclosed is reduced by a factor of approximately five times before it reaches the driving mechanism of the transmitter.

It is readily apparent from the foregoing that if an operator applies a forcing torque that is ten times the normal torque as the dial returns to its normal run-down, the torque thus applied manually will be only about twice the normal as applied to the call transmitter. The governors used in call transmitters, to which the brake of this invention is applicable, have forcing characteristics which indicate that a forcing torque ten times normal corresponds to a dial speed of 16 pulses per second ($\mu$=.25). A forcing torque twice normal corresponds to a speed of 12 pulses per second. Thus the brake of this invention only permits the dial to be forced to a speed of 12 pulses per second with a forcing torque about ten times normal.

While I have shown and described the preferred embodiment of my invention, it is to be understood that various changes and modifications may be made therein without departing from the spirit of the invention.

What is claimed is:

1. A call transmitter comprising a manually rotatable finger wheel, an electrical impulse transmitter mechanism operably connected to said finger wheel, an energy storing spring for rotating said finger wheel in a counterclockwise direction to cause the operation of said impulse transmitter when the finger wheel has been rotated in a clockwise direction a predetermined distance and released, and means on said finger wheel in engagement with a stationary portion on said call transmitter for braking said finger wheel upon manual acceleration of said wheel during its run-down.

2. A call transmitter comprising a manually rotatable finger wheel, an electrical impulse transmitter mechanism operably connected to said finger wheel, an energy storing spring for rotating said finger wheel in a counterclockwise direction to cause the operation of said impulse transmitter when the finger wheel has been rotated in a clockwise direction a predetermined distance and released, and flexible means secured to said finger wheel in engagement with a stationary portion on said call transmitter for braking said finger wheel upon manual acceleration of said wheel during its run-down.

3. A call transmitter comprising a manually rotatable finger wheel, an electrical impulse transmitter mechanism operably connected to said finger wheel, an energy storing spring for rotating said finger wtheel in a counterclockwise direction to cause the operation of said impulse transmitter when the finger wheel has been rotated in a clockwise direction a predetermined distance and released, and flexible means secured to said finger wheel embracing the outer surface of a stationary portion on said call transmitter for braking said finger wheel upon manual acceleration of said wheel during its run-down.

4. A call transmitter comprising a frame, a number plate secured to said frame, a rotatable shaft journaled in said frame, a hub member affixed to said shaft, a spring for rotating said hub and shaft in a counterclockwise direction, a finger wheel mounted on said hub, for the manual rotation of said shaft in a clockwise direction to tension said spring, an electrical impulse transmitting mechanism operatively connected to said shaft, a drum member secured to said frame, a flexible band embracing the outer surface of said drum, one end of said band secured to the finger wheel and the other end secured to the hub member whereby the finger wheel is braked to prevent manual acceleration of the finger wheel during its counterclockwise rotation under the influence of the spring.

5. A call transmitter comprising a frame, a number plate secured to and overlying said frame, a rotatable shaft journaled in said frame and projecting above the surface of said number plate, a hub member affixed to said shaft, spring means connected to said hub for rotating said hub and shaft in a counterclockwise direction, a finger wheel positioned on said hub, for the manual rotation of said shaft in a clockwise direction to store energy in said spring, an electrical impulse transmitting mechanism operatively connected to said shaft, a flanged stationary member secured to said frame, positioned coaxially with respect to said shaft and extending above the surface of said number plate, a flexible band embracing the outer periphery of said flanged member, one end thereof secured to the finger wheel and the other end secured to said hub member whereby the finger wheel is braked to prevent manual acceleration of the finger wheel during its counterclockwise rotation under the influence of the spring.

6. A call transmitter comprising a frame, a number plate secured to and overlying said frame, a rotatable shaft journaled in said frame and projecting above the surface of said number plate, a hub member affixed to said shaft, spring means connected to said hub for rotating said hub and shaft in a counterclockwise direction, a finger wheel in frictional engagement with said hub, for the manual rotation of said shaft in a clockwise direction to store energy in said spring, an electrical impulse transmitting mechanism operatively connected to said shaft, a flanged stationary member secured to said frame, positioned coaxially with respect to said shaft and extending above the surface of said number plate, a flexible band embracing the outer periphery of said flanged member, one end thereof secured to the finger wheel and the other end secured to said hub member whereby the finger wheel is braked to prevent manual acceleration of the finger wheel during its counterclockwise rotation under the influence of the spring.

No references cited.